(12) United States Patent
Takeuchi

(10) Patent No.: US 7,520,739 B2
(45) Date of Patent: Apr. 21, 2009

(54) INJECTION MOLDING APPARATUS HAVING A WEIGHING BLOCK

(75) Inventor: Hiroshi Takeuchi, Ota-Ku (JP)

(73) Assignee: Shinko Sellbic Co., Ltd., Tokyo (JP)

( * ) Notice: Subject to any disclaimer, the term of this patent is extended or adjusted under 35 U.S.C. 154(b) by 170 days.

(21) Appl. No.: 10/592,889

(22) PCT Filed: Mar. 24, 2005

(86) PCT No.: PCT/JP2005/005335

§ 371 (c)(1),
(2), (4) Date: Jan. 9, 2007

(87) PCT Pub. No.: WO2005/090050

PCT Pub. Date: Sep. 29, 2005

(65) Prior Publication Data

US 2007/0184146 A1    Aug. 9, 2007

(30) Foreign Application Priority Data

Mar. 24, 2004   (JP) .............................. 2004-087482

(51) Int. Cl.
*B29C 45/76* (2006.01)
(52) U.S. Cl. ..................... 425/140; 425/145; 425/148
(58) Field of Classification Search ................. 425/140, 425/145, 148
See application file for complete search history.

(56) References Cited

U.S. PATENT DOCUMENTS 2,873,478 A * 2/1959 Schieser et al. ............. 425/148
4,692,107 A * 9/1987 Morikawa et al. ........... 425/140
4,867,665 A * 9/1989 Wada ......................... 425/145
4,883,417 A * 11/1989 Morikawa et al. ........... 425/140
4,952,344 A * 8/1990 Burgess ...................... 425/145
5,260,008 A * 11/1993 Yokota ........................ 425/145

FOREIGN PATENT DOCUMENTS

| JP | 07-164494 | A1 | 6/1995 |
| JP | 07-036729 | Y2 | 8/1995 |
| JP | 07-223248 |    | 8/1995 |
| JP | 09-141688 | A1 | 6/1997 |
| JP | 10-272656 | A1 | 10/1998 |
| JP | 2000-094485 | A1 | 4/2000 |
| JP | 2001-355685 |    | 12/2001 |
| JP | 2002-292712 |    | 10/2002 |

* cited by examiner

*Primary Examiner*—Tim Heitbrink
(74) *Attorney, Agent, or Firm*—Burr & Brown

(57) ABSTRACT

An injection molding apparatus includes a plasticizing block that includes therein a plasticizing and force-feeding mechanism which heats and plasticizes a material and force-feeds the material while kneading it, a weighing block that is connected to the plasticizing block in close contact with it, and includes therein a weighing and feeding mechanism which weighs and feeds out the material force-fed by the plasticizing and force-feeding mechanism, a fixed die plate that includes therein an injection mechanism which injects the material weighed and fed out by the weighing and feeding mechanism into a cavity, a movable die plate that advances to and retreats from the fixed die plate and makes the cavity a substantially closed space when abutting on the fixed die plate, and a clamping housing that includes therein a movable die plate drive mechanism.

21 Claims, 11 Drawing Sheets

(a)

(b)

(c)

(a)

(b)

(c)

(a)

(b)

(c)

INJECTION MOLDING APPARATUS HAVING A WEIGHING BLOCK

TECHNICAL FIELD

The present invention relates to a compact motor-driven type injection molding apparatus which does not need a base stand.

BACKGROUND ART

An injection molding apparatus has a clamping device which clamps a mold so that a cavity in the mold becomes a closed space, an injection unit which injects a plasticized material into the cavity, and a plasticizing unit which plasticizes the material as basic components.

However, since such conventional injection molding apparatuses are large in size and heavy, they are desired to be compact and light, and various kinds of techniques are proposed. For example, the technique of making a cassette mold compact and light by making the periphery of the cavity a replaceable cassette of an insertion type (see Patent Document 1), and the technique of assembling a screw for plasticizing a material and a motor substantially integrally by a gear meshing structure to make the apparatus compact and light (see Patent Document 2) are proposed.

Techniques of reducing size and weight by providing clamping mechanisms at the injection device side, replacing long screws with short conical screws, and driving the screws by air pressure are proposed (see Patent Documents 3 and 4).

Patent Document 1: Japanese Utility Model Publication No. 7-36729
Patent Document 2: Japanese Patent Application Laid-open No. 11-207744
Patent Document 3: Japanese Patent Application Laid-open No. 8-1740
Patent Document 4: Japanese Patent Publication No. 7-164494

DISCLOSURE OF THE INVENTION

Problem to be Solved by the Invention

However, since in such techniques of reduction in size and weight, reduction in size and weight of each component is proposed, and as a result, reduction in size and weight of the entire injection molding apparatus is achieved, there is the problem of being unable to achieve sufficient reduction in size and weight.

Namely, since each of the above described proposals reduces sizes and weights of the basic components such as a mold, a clamping device, an injection unit and a plasticizing unit independently to reduce the weight of the injection molding apparatus, it cannot help succeeding the basic construction including the layout or the like of each component which becomes the basis, and for example, the longitudinal dimension and the like of the injection molding apparatus hardly changes and remains to be long.

Since each of the components is independently reduced in size and weight, reduction in size and weight cannot be effected in liaison with one another. Thus, a so-called dead space tends to occur, and a load which can be essentially supported by a plurality of components tends to be designed to be supported by each component. Therefore, there arises the problem of being incapable of achieving sufficient reduction in size and weight.

Thus, the present invention is made in view of such a problem, and has an object to provide an injection molding apparatus and a scroll for the injection molding apparatus which achieve reduction in size and weight and simplification by suppressing occurrence of a dead space and reducing the number of components while satisfying assembly easiness without reducing the performance of the injection molding apparatus by generally considering reduction in size and weight as the entire injection molding apparatus.

Means for Solving the Problems

In order to solve the above described problems, the first aspect of the invention is an injection molding apparatus which injection-molds a product by injecting a plasticized material into a cavity of a mold, and characterized by having a plasticizing block that includes therein a plasticizing and force-feeding mechanism which heats and plasticizes a material and force-feeds the material while kneading it; a weighing block that is connected to the plasticizing block in close contact with it, and includes therein a weighing and feeding mechanism which weighs and feeds out the material force-fed by the aforesaid plasticizing and force-feeding mechanism; a fixed die plate that includes therein an injection mechanism which injects the material weighed and fed out by the aforesaid weighing and feeding mechanism into a cavity; a movable die plate that advances to and retreats from the fixed die plate and makes the aforesaid cavity a substantially closed space when abutting on the fixed die plate; and a clamping housing that includes therein a movable die plate drive mechanism which is fixedly provided at a predetermined distance from the aforesaid fixed die plate by a plurality of tie bars for guiding the aforesaid movable die plate, advances and retreats the movable die plate to and from the aforesaid fixed die plate, and generates a predetermined clamping force when the movable die plate abuts on the aforesaid fixed die plate.

The second aspect of the invention is characterized in that the aforesaid plasticizing and force-feeding mechanism has a barrel that heats and plasticizes the material; a scroll of a substantially short columnar rotary body that has a spiral groove for transferring the material formed therein, promotes plasticizing and kneading of the material in the aforesaid spiral groove by rotating while contacting in plane with the aforesaid barrel, and force-feeds the material into an injection cylinder formed in its center of rotation; and a scroll drive part which rotates the scroll.

The third aspect of the invention is characterized in that the spiral groove in the aforesaid scroll is constituted of a scraping groove that is formed by cutting with an end mill applied to a side surface of the rotary body in parallel with a rotational axis of the scroll, and takes charge of scraping the material; and a feeding groove that is formed by cutting a front surface of the rotary body into a spiral shape continuously from the scraping groove to reduce toward the center of rotation, and takes charge of transferring, plasticizing, kneading and force-feeding the scraped material.

The fourth aspect of the invention is characterized in that the aforesaid weighing and feeding mechanism has an injection plunger that is inserted into the aforesaid injection cylinder; a ball screw for the plunger that is attachably and detachably engaged with the injection plunger by a dovetail groove; and a plunger drive part that drives the ball screw for the plunger to cause the aforesaid injection plunger to perform piston movement in the aforesaid injection cylinder, and thereby applies a feeding force of the force-fed material to the injection plunger.

The fifth aspect of the invention is characterized in that the aforesaid injection plunger has a tip end hole formed by being bored from its tip end surface; an introduction hole formed by trenching on a side surface in a longitudinal direction and is formed so that a groove end at the tip end side communicates with the aforesaid tip end hole; a feeding notch that is formed by notching the tip end hole in the longitudinal direction and feeds out the material from the tip end hole; and a valve body that is stopped in the tip end hole while being loosely fitted in the aforesaid tip end hole; interrupts injection of the material by shutting off communication of the feeding notch and the introduction hole when pressure at the aforesaid feeding notch side becomes higher than pressure at the introduction hole side, and allows injection of the material by communicating the aforesaid feeding notch and the introduction hole to with each other when the pressure at the aforesaid feeding notch side becomes lower than the pressure at the introduction hole side.

The sixth aspect of the invention is characterized in that the aforesaid injection mechanism includes a hot runner in which the material fed out by the aforesaid injection plunger flows; a nozzle that injects the material into the aforesaid cavity by being selected in accordance with a product to be injection-molded and mounted to a tip end of the aforesaid hot runner; and a hot runner hole that accommodates the hot runner and the nozzle to be capable of being inserted in and extracted from it.

The seventh aspect of the invention is characterized in that a mold which forms the aforesaid cavity has a fixed mold piece that is mounted to the aforesaid fixed die plate; a movable mold piece that is mounted to the aforesaid movable die plate and forms a cavity of a substantially closed space when the movable die plate abuts on the aforesaid fixed die plate; a taper pin formed in one of the movable mold piece and the aforesaid fixed mold piece; and a taper hole that is formed in the other of the mold pieces and performs positioning of the aforesaid taper pin inserted into it when the aforesaid movable mold piece abuts on the aforesaid fixed mold piece.

The eighth aspect of the invention is characterized by further including an extruding part to which a plurality of extrusion pins provided to penetrate through the aforesaid movable mold piece to be inserted into the aforesaid cavity are fixed; a spring that biases the aforesaid extruding part so that head portions of the aforesaid extrusion pins normally form a wall surface of the cavity; and an insertion hole which is formed in the aforesaid movable die plate, and allows a head portion of a clamping ball screw to penetrate through it to abut on the aforesaid extruding part to press the extruding part to the cavity side against the aforesaid spring to thereby make it possible to extrude an injection molded product in the cavity, when the movable die plate retreats to the aforesaid clamping housing side by a predetermined amount or more.

The ninth aspect of the invention is characterized in that a plurality of plasticizing units each constituted of one of the aforesaid plasticizing block and one of the aforesaid weighing block are provided, in that one clamping unit constituted of one of the aforesaid fixed die plate, one of the aforesaid movable die plate and one of the aforesaid clamping housing is provided, and in that a clamping unit moving part that moves the aforesaid clamping unit correspondingly to each of the plasticizing units so that different materials can be injected into one cavity is provided.

The tenth aspect of the invention is characterized in that respective abutting surfaces of the aforesaid scroll and the aforesaid barrel are formed into conical shapes.

The eleventh aspect of the invention is characterized in that the respective abutting surfaces of the aforesaid scroll and the aforesaid barrel are formed into concave conical shapes recessed to the scroll side.

The twelfth aspect of the invention is characterized in that the spiral groove in the aforesaid scroll is constituted of a scraping groove that is formed by cutting with an end mill applied to a side surface of a rotary body in parallel with a rotational axis of the scroll and takes charge of scraping the material; and a feeding groove that is formed by cutting a front surface of the rotary body into a spiral shape continuously from the scraping groove so as to reduce toward a center of rotation, and takes charge of transferring, plasticizing, kneading and force-feeding the scraped material.

The thirteenth aspect of the invention is characterized in that the aforesaid scroll drive part has a worm gear obtaining rotational power from a motor; and a worm wheel that is meshed with the worm gear to reduce rotational frequency of the aforesaid motor, and attachably and detachably engages with the aforesaid scroll via a heat insulating plate to rotate the scroll at a reduced rotational frequency.

The fourteenth aspect of the invention is characterized in that the aforesaid weighing and feeding mechanism has an injection plunger that is inserted into the aforesaid injection cylinder; a ball screw for the plunger that is attachably and detachably engaged with the injection plunger by a dovetail groove; and a plunger drive part that drives the ball screw for the plunger to cause the aforesaid injection plunger to perform piston movement in the aforesaid injection cylinder, and thereby applies a feeding force of the force-fed material to the injection plunger.

The fifteenth aspect of the invention is characterized in that the aforesaid injection plunger has a tip end hole formed by being bored from its tip end surface; an introduction hole formed by trenching on a side surface in a longitudinal direction and is formed so that a groove end at the tip end side communicates with the aforesaid tip end hole; a feeding notch that is formed by notching the tip end hole in the longitudinal direction and feeds out the material from the tip end hole; and a valve body that is stopped in the tip end hole while being loosely fitted in the aforesaid tip end hole, interrupts injection of the material by shutting off communication of the feeding notch and the introduction hole when pressure at the aforesaid feeding notch side becomes higher than pressure at the introduction hole side, and allows injection of the material by communicating the aforesaid feeding notch and the introduction hole with each other when the pressure at the aforesaid feeding notch side becomes lower than the pressure at the introduction hole side.

The sixteenth aspect of the invention is characterized in that the aforesaid injection mechanism includes a hot runner in which the material fed out by the aforesaid injection plunger flows; a nozzle that injects the material into the aforesaid cavity by being selected in accordance with a product to be injection-molded and mounted to a tip end of the aforesaid hot runner; and a hot runner hole that accommodates the hot runner and the nozzle to be capable of being inserted in and extracted from it.

The seventeenth aspect of the invention is characterized in that the aforesaid plunger drive part has a worm gear obtaining rotational power from a motor; and a worm wheel that is meshed with the worm gear to reduce rotational frequency of the aforesaid motor and transmit it to the aforesaid ball screw for plunger, and thereby causes the aforesaid injection plunger attachably and detachably engaged with the ball screw for plunger to perform piston movement.

The eighteenth aspect of the invention is characterized in that the aforesaid movable die plate drive mechanism has a clamping ball screw that is threadedly fitted to a ball screw nut mounted to the aforesaid movable die plate; a worm gear obtaining rotational power from a motor; and a worm wheel that is meshed with the worm gear to reduce the rotational frequency of the aforesaid motor to transmit it to the aforesaid clamping ball screw, and thereby advances and retreats the aforesaid movable die plate.

The nineteenth aspect of the invention is characterized in that a mold which forms the aforesaid cavity has a fixed mold piece that is mounted to the aforesaid fixed die plate; a movable mold piece that is mounted to the aforesaid movable die plate and forms a cavity of a substantially closed space when the movable die plate abuts on the aforesaid fixed die plate; a taper pin formed in one of the movable mold piece and the aforesaid fixed mold piece; and a taper hole that is formed in the other of the mold pieces and performs positioning of the aforesaid taper pin inserted into it when the aforesaid movable mold piece abuts on the aforesaid fixed mold piece.

The twentieth aspect of the invention is characterized by further including an extruding part to which a plurality of extrusion pins provided to penetrate through the aforesaid movable mold piece to be inserted into the aforesaid cavity are fixed; a spring that biases the aforesaid extruding part so that head portions of the aforesaid extrusion pins normally form a wall surface of the cavity; and an insertion hole which is formed in the aforesaid movable die plate, and allows a head portion of a clamping ball screw to penetrate through it to abut on the aforesaid extruding part to press the extruding part to the cavity side against the aforesaid spring to thereby make it possible to extrude an injection molded product in the cavity, when the movable die plate retreats to the aforesaid clamping housing side by a predetermined amount or more.

The twenty-first aspect of the invention is characterized in that a plurality of plasticizing units each constituted of one of the aforesaid plasticizing block and one of the aforesaid weighing block are provided, in that one clamping unit constituted of one of the aforesaid fixed die plate, one of the aforesaid movable die plate and one of the aforesaid clamping housing is provided, and in that a clamping unit moving part that moves the aforesaid clamping unit correspondingly to each of the plasticizing units so that different materials can be injected into one cavity is provided.

The twenty-second aspect of the invention is characterized by a scroll for an injection molding apparatus that scrapes and transfers a material, promotes plasticizing and kneading of the material during transferring, and force-feeds the plasticized material, the scroll having a spiral groove constituted of a scraping groove that is formed by cutting with an end mill applied to a side surface of a rotary body in parallel with a rotational axis thereof and takes charge of scraping the material; and a feeding groove that is formed by cutting a front surface of the rotary body into a spiral shape continuously from the scraping groove so as to reduce toward a center of rotation and takes charge of transferring, plasticizing, kneading and force-feeding the scraped material.

The twenty-third aspect of the invention is characterized in that a surface formed by connecting a groove top portion of the aforesaid feeding groove in the aforesaid scroll forms a conical shape.

The twenty-forth aspect of the invention is characterized in that the surface formed by connecting the groove top portion of the aforesaid feeding groove in the aforesaid scroll forms a concave conical shape recessed toward its center.

Effect of the Invention

According to the present invention, a plasticizing block that includes therein a plasticizing and force-feeding mechanism which heats and plasticizes a material and force-feeds the material while kneading it; a weighing block that is connected to the plasticizing block in close contact with it, and includes therein a weighing and feeding mechanism which weighs and feeds out the material force-fed by the plasticizing and force-feeding mechanism; a fixed die plate that includes therein an injection mechanism which injects the material weighed and fed out by the weighing and feeding mechanism into a cavity; a movable die plate that advances to and retreats from the fixed die plate and makes the cavity a substantially closed space when abutting on the fixed die plate; and a clamping housing that includes therein a movable die plate drive mechanism which is fixedly provided at a predetermined distance from the fixed die plate by a plurality of tie bars for guiding the movable die plate, advances and retreats the movable die plate to and from the fixed die plate, and generates a predetermined clamping force when the movable die plate abuts on the fixed die plate are included. Therefore, occurrence of a dead space is suppressed and the number of components is reduced while assembling easiness is satisfied without reducing the performance of the injection molding apparatus, thereby making it possible to achieve reduction in size and weight and simplification.

The scroll has a spiral groove constituted of a scraping groove that is formed by cutting with an end mill applied to a side surface of a rotary body in parallel with a rotational axis of the scroll and takes charge of scraping the material, and a feeding groove that is formed by cutting a front surface of the rotary body into a spiral shape continuously from the scraping groove so as to reduce toward a center of rotation, and takes charge of transferring, plasticizing, kneading and force-feeding the scraped material. Therefore, it is possible to efficiently perform transfer, plasticizing, kneading and force-feeding with a small size.

EXPLANATION OF NUMERALS

| | |
|---|---|
| 1 | PLASTICIZING PART |
| 2 | MOLD PART |
| 3 | WEIGHING AND INJECTING PART |
| 4, 5, 6 | MOTOR |
| 11 | PLASTICIZING BLOCK (BODY) |
| 12 | SCROLL |
| 13 | MATERIAL INPUT HOLE |
| 14, 25, 36 | WORM WHEEL |
| 15, 26, 37 | WORM GEAR |
| 22 | CASSETTE MOLD |
| 23 | CLAMPING BALL SCREW |
| 24, 35 | BALL SCREW NUT |
| 27 | MOVABLE DIE PLATE DRIVE PART |
| 31 | WEIGHING BLOCK (BODY) |
| 32 | INJECTION PLUNGER |
| 33 | BALL SCREW FOR PLUNGER |
| 34 | DOVETAIL GROOVE |
| 39, 41 | INJECTION CYLINDER |
| 40 | TIE BAR |
| 42 | SCROLL DRIVE PART |
| 43 | SPIRAL GROOVE |
| 44 | SCROLL SHAFT HOLE |
| 45 | FEEDING GROOVE (KNEADING GROOVE) |
| 46 | SCRAPING GROOVE (GUIDE GROOVE) |
| 47 | SCROLL WORKING SURFACE |
| 48 | SCROLL SIDE SURFACE |
| 49 | DRIVE PART ENGAGING GROOVE |
| 50 | THRUST BEARING |
| 52 | BARREL POCKET |
| 53 | COOLING WATER PASSAGE |
| 54 | HEAT INSULATOR |
| 55 | COOLING WATER PASSAGE |
| 57 | HOT RUNNER |
| 58 | RUNNER TUBE |
| 59 (59a~59c) | NOZZLE |
| 61 | PLUNGER DRIVE PART |
| 64 | FEEDING NOTCH |
| 65 | INTRODUCTION HOLE |
| 66 | VALVE BODY |
| 68 | THRUST BEARING |
| 69 | TIP END HOLE |
| 74 | POSITIONING PIN |
| 75 | PIN RECEIVING HOLE |
| 76 | RUNNER RECEIVING HOLE |
| 78 | CLAMPER |
| 79 | CLAMP GROOVE |
| 80 | CLAMP CLAW |
| 81 | CLAMP BOLT |
| 84 | HEATER HOLE |
| 91 | EXTRUDING PART |
| 92 | EXTRUSION PIN |
| 93 | SUPPORT PLATE |
| 94 | EXTRUDING PLATE |
| 95 | SUPPORT ROD |
| 97 | SPRING |
| 98 | THRUST BEARING |
| 99 | HEAD PORTION |
| 100 | NUT BIASING SPRING |
| 101 | LOAD CELL |
| 105 | HEAD PORTION |
| 106 | INSERTION HOLE |
| 121 | BARREL |
| 211 | FIXED DIE PLATE (FIXED SIDE MEMBER) |
| 212 | CLAMPING HOUSING (FIXED SIDE MEMBER) |
| 213 | MOVABLE DIE PLATE (MOVABLE SIDE MEMBER) |
| 221 | FIXED MOLD PIECE (FIXED SIDE MEMBER) |
| 222 | MOVABLE MOLD PIECE (MOVABLE SIDE MEMBER) |

Best Mode for Carrying out the Invention

Figure 1:
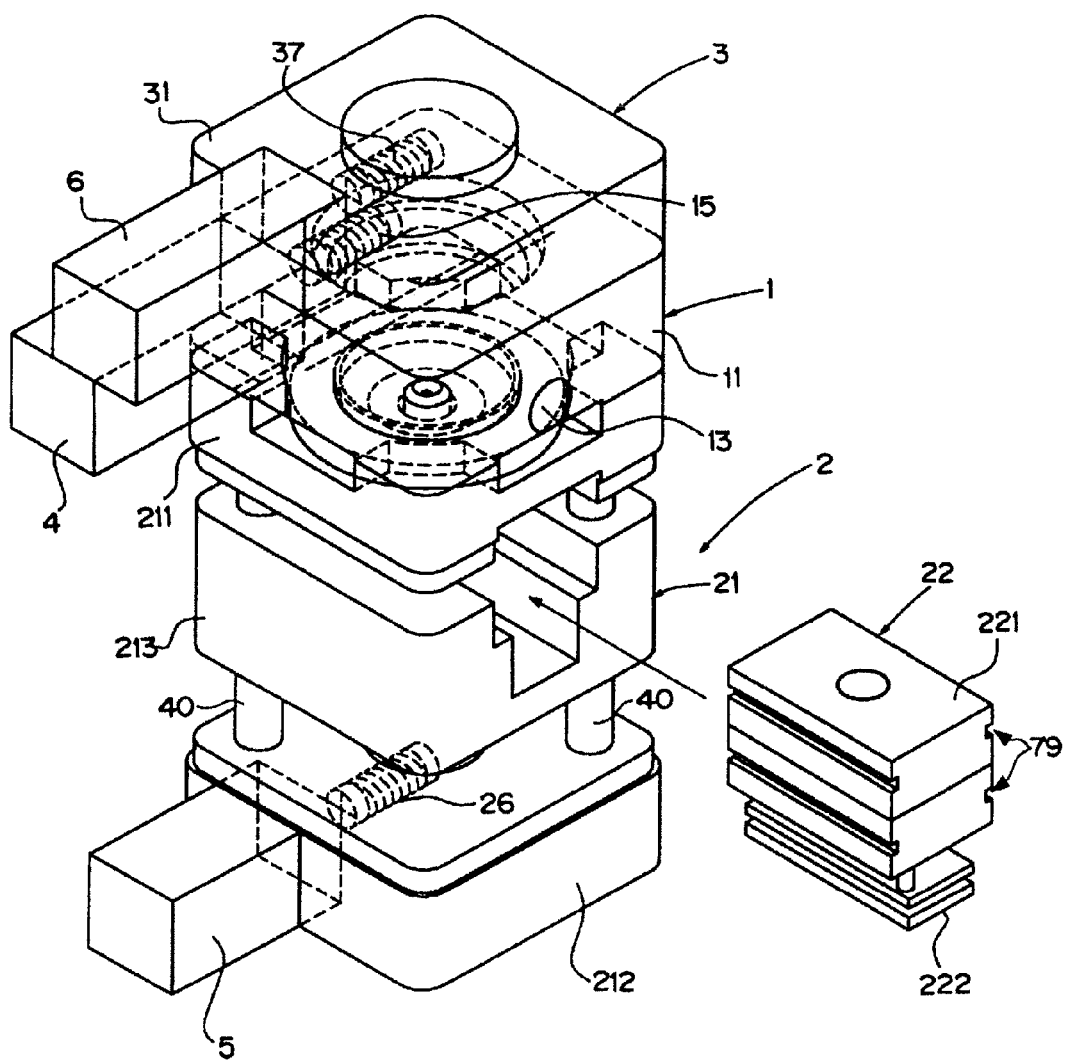
FIG. 1 is a perspective view of an injection molding apparatus according to the present invention.
Figure 2:
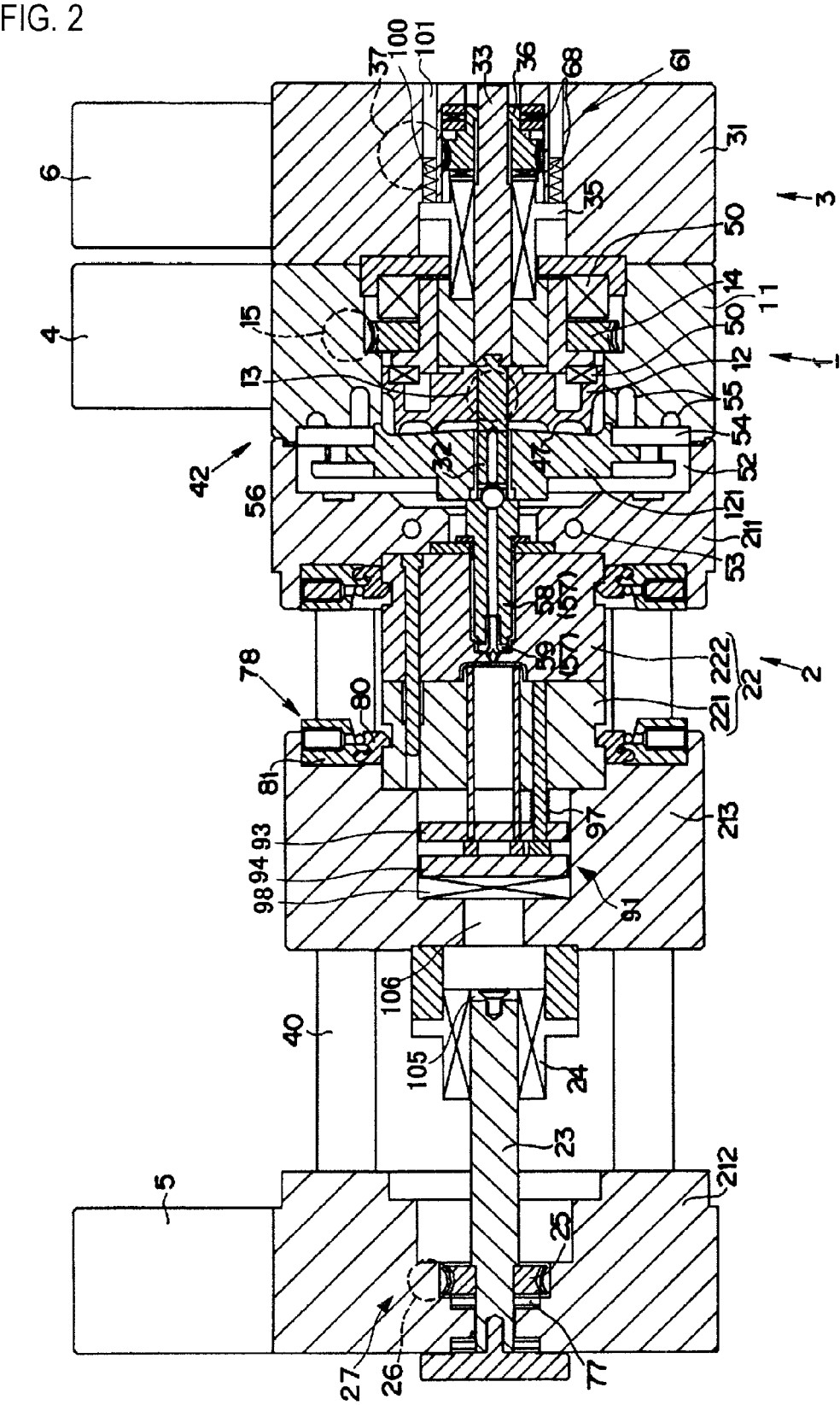
FIG. 2 is a sectional view.

An embodiment of the present invention will be described with reference to the drawings. FIG. 1 is a perspective view, and FIG. 2 is a sectional view. In this embodiment, an example of the case where a thermoplastic resin is injection-molded will be described, but it should be added in advance that the present invention is similarly applicable to the case where a thermoset thing resin, wax, and binder-treated ceramics and iron powder are injection-molded.

The injection molding apparatus includes a plasticizing part including a plasticizing block (body) 11 including, therein, a plasticizing and force-feeding mechanism which heats and plasticizes a material and force-feeds the material while kneading it, and a weighing and injecting part 3 including a weighing block (body) 31 connected to the plasticizing block 11 in close contact with it, and including, therein, a weighing and feeding mechanism which weighs and feeds out the material force-fed by the plasticizing and force-feeding mechanism.

Further, the injection molding apparatus includes a mold part 2 including a fixed die plate (fixed side member) 211 being used as a matrix of the mold and including, therein, an injection mechanism which injects in a cavity, the material weighed and fed out by the weighing and feeding mechanism, a movable die plate (movable side member) 213 being used as a matrix of the mold which advances to and retreats from the fixed die plate 211, and makes a cavity a substantially closed space when abutting on the fixed die plate 211, and a clamping housing (fixed side member) 212 including, therein, a movable die plate drive mechanism which is fixedly provided at a predetermined distance from the fixed die plate 211 by a plurality of tie bars 40 to which the movable die plate 213 is loosely fitted to be guided, advances and retreats the movable die plate 213 relative to the fixed die plate 211, and generates a predetermined clamping force when the movable die plate 213 abuts on the fixed die plate 211.

Hereinafter, details will be described.

A material input hole 13 through which a material such as pellet is inputted is formed in one side surface (the surface which is at the upper side when installed) of the plasticizing block 11.

The plasticizing and force-feeding mechanism (kneading mechanism) is provided inside the plasticizing block 11; The plasticizing and force-feeding mechanism includes a barrel 121 which heats the material inputted from the material input hole 13, a scroll 12 that has a spiral groove 43, which transfers the material, formed thereon and rotates while abutting on the barrel 121, thereby transferring, agitating, plasticizing, and kneading the material while the material is heated, and with the Weissenberg effect after plasticizing the material, force-feeds the material to a scroll shaft hole 44 formed in its center of rotation, and a scroll drive part 42 which drives to rotate the scroll 12.

Figure 3:
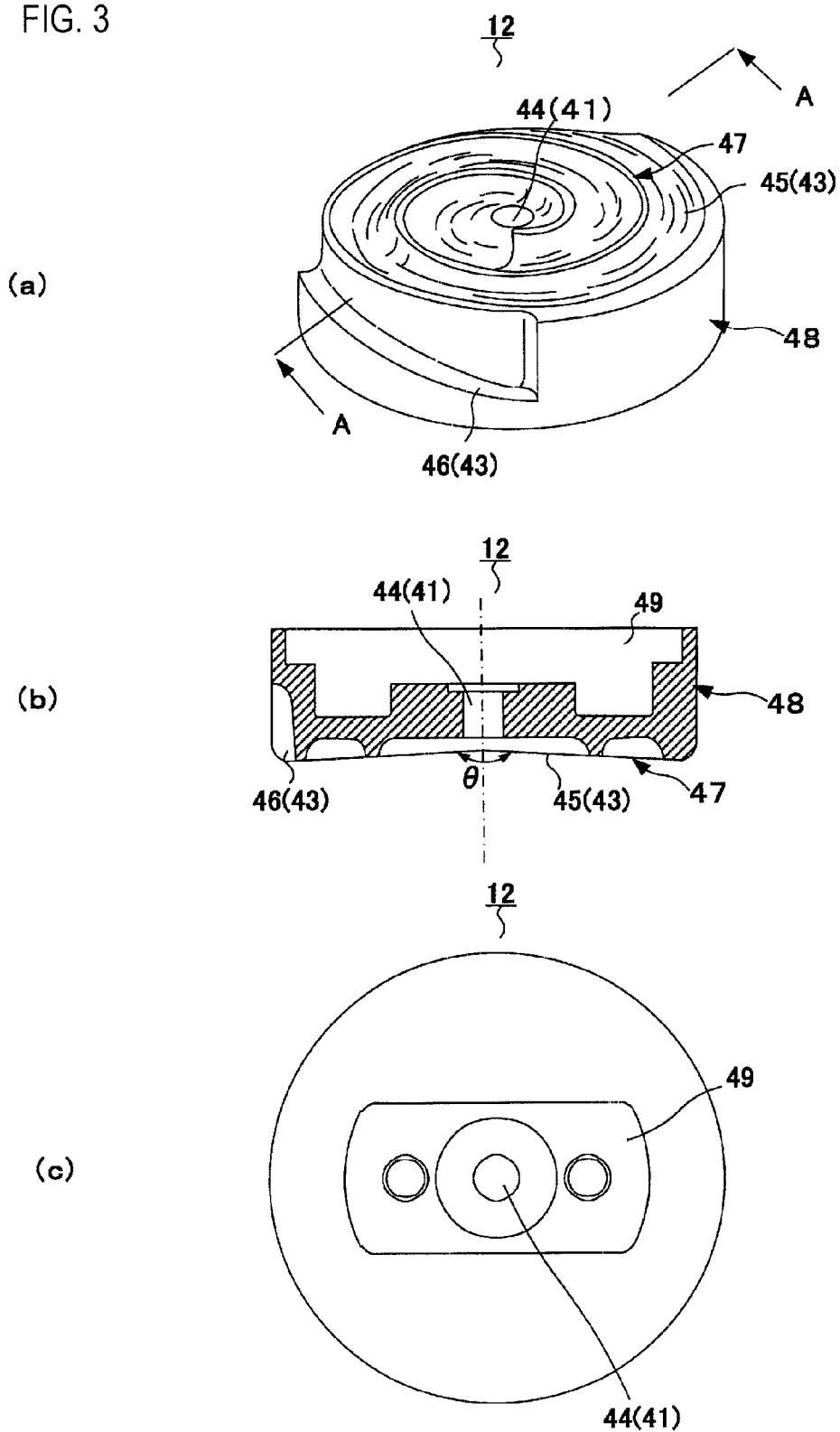
FIG. 3 is a view showing a constitution of a scroll.

The scroll 12 is a rotary body forming a substantially short columnar shape as shown in FIG. 3 and the like, and the spiral groove 43 is formed from a side surface of the rotary body to a surface on a fixed die plate 211 side. The spiral groove 43 is formed to reduce in accordance with a rotational direction of the scroll 12 to a portion near the scroll shaft hole 44 through which the injection plunger 32 formed at a rotary shaft is inserted, and a drive part engaging groove 49 formed into a concave shape is formed on its back surface. The scroll shaft hole 44 is also used as an injection cylinder 41.

Hereinafter, the surface on the fixed die plate 211 side is referred to as a scroll working surface 47, and its side surface is referred to as a scroll side surface 48. The spiral groove 43 which is formed on the scroll working surface 47 is referred to as a feeding groove (kneading groove) 45, and the spiral groove 43 which is formed on the scroll side surface 48 is referred to as a scraping groove (guide groove) 46. Accordingly, the spiral groove 43 is constituted by the scraping groove 46 and the feeding groove 45.

FIG. 3(a) is a perspective view overlooking the scroll working surface 47, FIG. 3(b) is a sectional view seen along A-A in FIG. 3(a), and FIG. 3(c) is a back view of the scroll 12.

The scroll working surface 47 and the barrel 121 are constituted to be in close contact with each other so that the material plasticized by heat from the barrel 121 does not run out of the feeding groove 45, and the material is force-fed toward the scroll shaft hole 44 along the feeding groove 45.

If a direct compressive force (N) of the material which causes the frictional force (F=Nμ) on the contact surface with the barrel 121 is small at this time, the material slips (idle-feeding state), and cannot be force-fed. Especially in the case of a slippery material such as nylon, PBT, and an oil bearing polymer, it frequently happens that force-feeding cannot be performed.

Thus, in the present invention, the scroll working surface 47 is formed to be a concave conical shape close to a plane with ax apex angle θ of the scroll working surface 47 satisfies θ=176 degrees to 174 degrees to cause the direct compressive force (N), and thereby, force-feeding of the material is made possible, as shown in FIG. 3(b).

Formation of the scroll working surface 47 into the concave conical shape means that as the feeding groove 45 is closer to the scroll shaft hole 44, its groove depth becomes shallower. Accordingly, as the feeding grove 45 is closer to the scroll shaft hole 44, the direct compressive force (N) becomes larger, and reliable force-feeding becomes possible.

Further, the Weissenberg effect and change in the circumferential velocity are added, so that a large force-feeding power can be obtained in spite of the small diameter and thickness, and an excellent plasticizing and kneading operation can be obtained.

FIG. 3(b) shows the case where the scroll working surface 47 is formed into the concave conical shape, but it may be formed into a convex conical shape.

The material of the scroll 12 is not limited to an iron metal, but the scroll 12 may be formed, for example, by brass, or a polymer resin with high heat resistance such as polytetrafluoroethylene, and polypyromellit.

Such a spiral groove 43 is formed by cutting with an end mill having an arc-shaped tip end vertically applied to the scroll working surface 47 (parallel with the rotary shaft of the scroll 12).

Namely, the scraping groove 46 is formed by performing cutting with a side blade of the end mill applied to the scroll side surface 48, and while the feed amount of the end mill is gradually decreased in this state (the end mill is moved in the direction away from the scroll 12), cutting is performed along the peripheral surface of the scroll side surface 48. When the tip end of the end mill reaches the scroll working surface 47, the feed amount of the end mill is fixed, and the spiral groove 43 is cut in a spiral form up to the scroll shaft hole 44.

Thereafter, the scroll working surface 47 is formed into the conical shape by cutting.

Accordingly, the spiral groove 43 can be formed by continuous operation of the end mill without changing the direction of the rotary shaft of the end mill, which facilitates cutting work, and makes it possible to reduce manufacturing cost.

Note that in the present invention, the scroll 12 is not limited to one cut product, but may be produced by pouring a resin or a metal into a mold.

The scroll drive part 42 has a worm wheel 14 with which a boss attachably and detachably engages via the drive part engaging groove 49 and a heat insulator, a worm gear 15 meshed with the worm wheel 14, a motor 4 which rotates the worm gear 15, a thrust bearing 50 and the like, and the worm wheel 14 and the worm gear 15 constitute a speed reducing mechanism.

As the motor 4 rotates, its rotational frequency is transmitted to the scroll 12 while reduced by the worm wheel 14 and the worm gear 15, and rotates the scroll 12.

Figure 4:
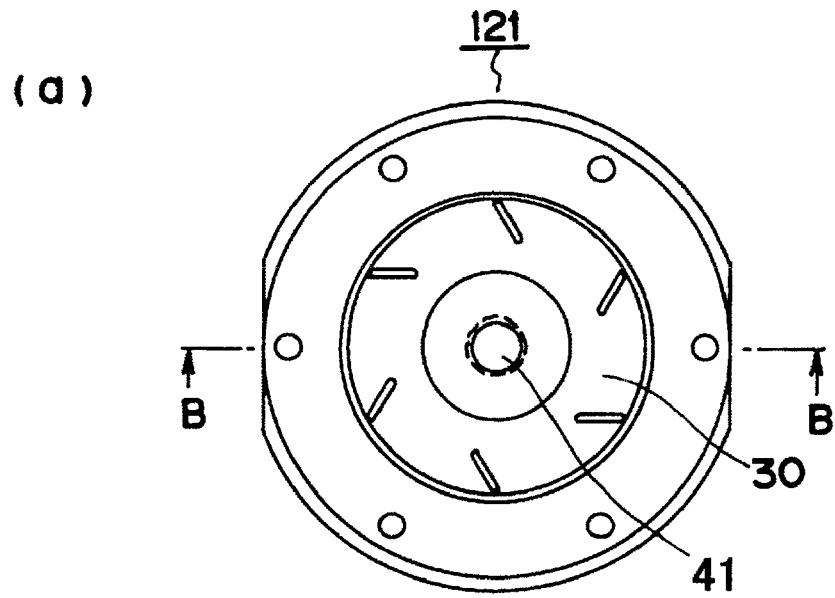
FIG. 4 is a view showing a constitution of a barrel.
Figure 4:
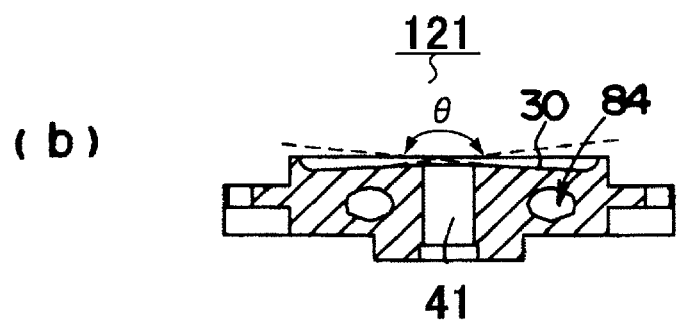
Figure 4:
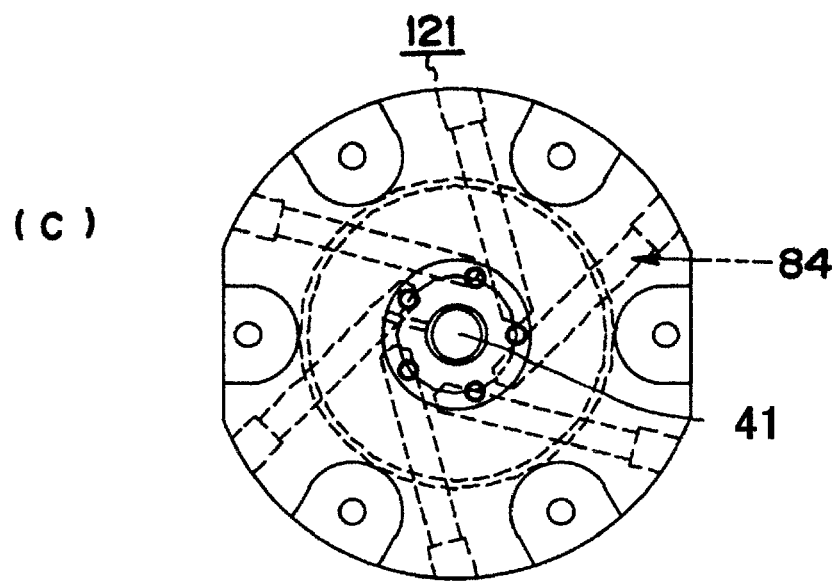

As shown in FIG. 4, the barrel 121 is in a substantially disc shape with the injection cylinder 41 formed in its center, and is an internally heating type of a cartridge heater, the cartridge heater being bar-shaped electric heaters not shown accommodated in heater holes 84 which are formed inside the barrel radially in the directions of the tangential lines in contact with a circle in the vicinity of the injection cylinder 41. A thermometer of thermocouple or the like not shown is mountable.

FIG. 4(a) is a view showing a surface on which the scroll working surface 47 abuts as a top view, FIG. 4(b) is a sectional view taken along the arrows B-B in FIG. 4(a), and FIG. 4(c) is a bottom view. In FIG. 4(c), the heater holes 84 are shown by the phantom lines.

As described above, a surface 30 of the barrel 121 is formed into a conical shape in a convex form to the scroll 12 side so as to contact the scroll working surface 47, so that the surface 30 abuts on the scroll working surface 47 to thereby close the groove space of the feeding groove 45.

The injection cylinder 41 which communicates with the scroll shaft hole 44 is formed in the center of the barrel 121, and the injection plunger 32 which will be described later is inserted into the injection cylinder 41 and performs piston movement.

Figure 5:
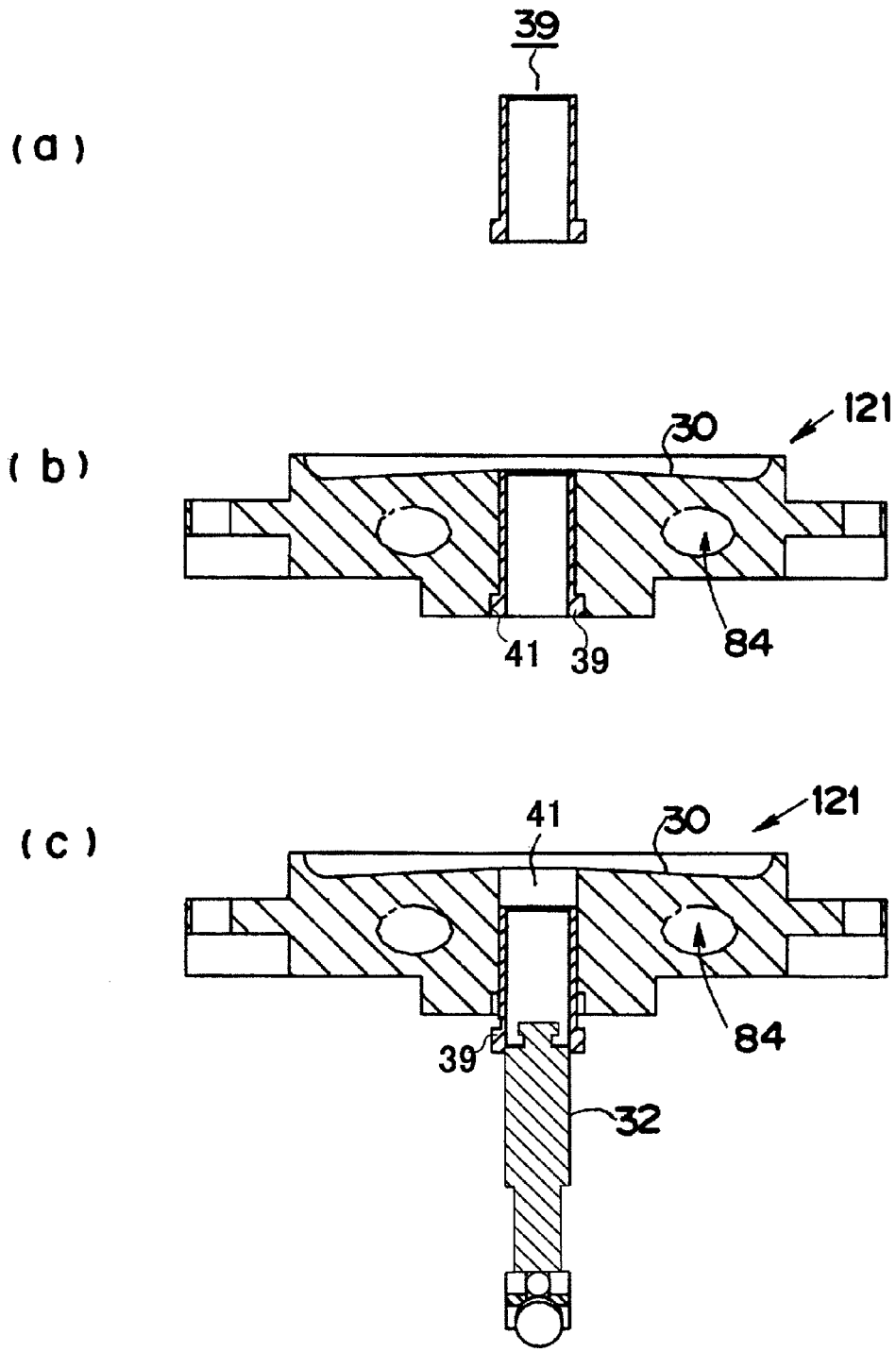
FIG. 5 is a view showing a sectional constitution of the barrel.

In order to make it possible to use the injection plungers 32 with various outside diameters in accordance with the products to be injection-molded, a sleeve-shaped injection cylinder 39 as shown in FIG. 5 is capable of being inserted in accordance with the outside diameter.

FIG. 5(a) is a sectional view of the injection cylinder 39, FIG. 5(b) is a sectional view when the injection cylinder 39 is fitted in the injection cylinder 41, and FIG. 5(c) is a sectional view showing a state halfway through the insertion of the injection plunger 32.

Such a barrel 121 is accommodated in and fixed to a barrel pocket 52 formed in the fixed die plate 211 and the plasticizing block 11.

By adopting the internal heating type of the cartridge heater in which a plurality of heater holes 84 are formed and the heater holes 84 are formed radially in the direction of the tangential lines in contact with the circle in the vicinity of the injection cylinder 41, the thermal capacity and volumetric capacity of the heater can be made small, and the temperature gradient is realized at the outer peripheral portion and the center portion.

Reduction in the thermal capacity of the heater means that the temperature controller including its power supply can be made compact in corporation with adoption of the internal heating type, and brings about the effect of being capable of suppressing excessive heat supply without using a heater of a large capacity.

By providing the temperature distribution so that the temperature of the center portion of the barrel 121 is a melting temperature and the temperature of the outer peripheral portion is lower than a material melting point, the temperature of the material becomes higher toward the injection cylinder 41 from the material input hole 13 side, and therefore, the problem that the material immediately after being inputted is fused and adhesive to be in a group can be prevented. Since the material is gradually softened and compressed from the grain form, discharge of air naturally occurs, and drawing-in of air by the plasticized material can be prevented.

Figure 7:
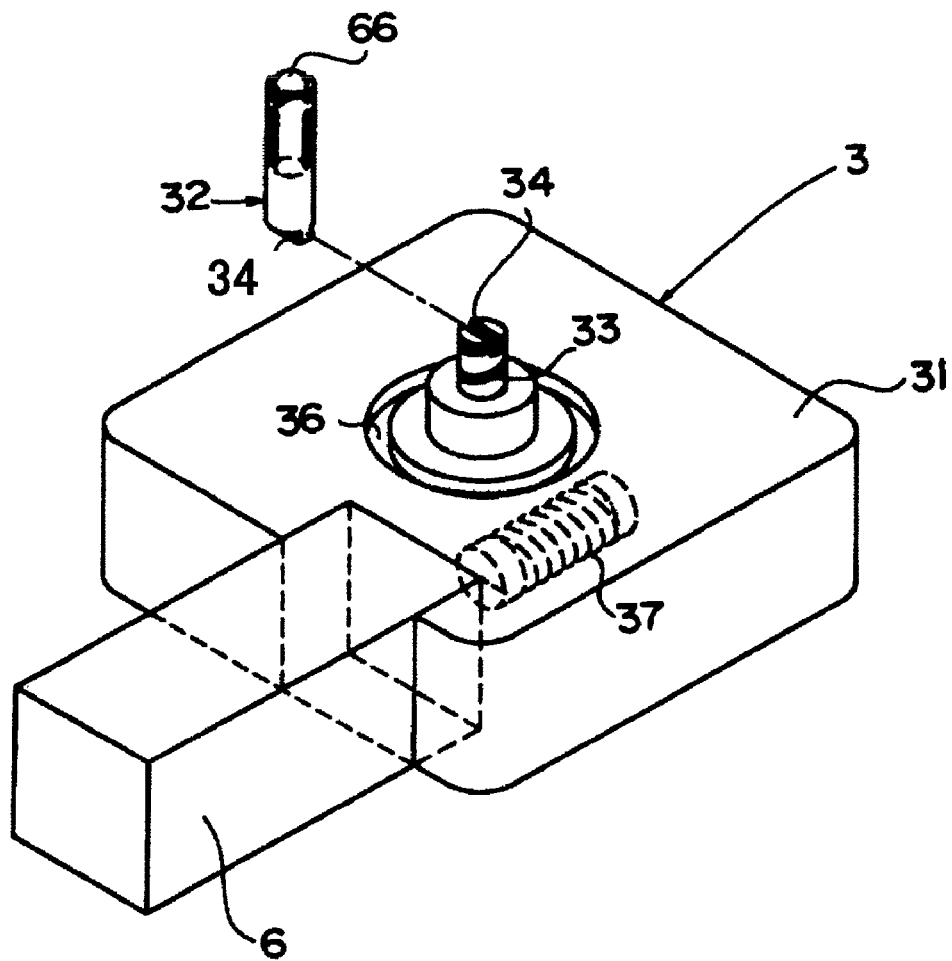
FIG. 7 is a back view of a weighing block.

In order to make the temperature distribution so that the temperature of the outer peripheral portion is low and the temperature becomes higher toward the center portion, the cartridge heaters are used, and the constitution in which the cartridge heaters are arranged in the directions of the tangential lines in contact with the circle in the vicinity of the injection cylinder 41 as shown in FIG. 7 is adopted.

Since the conventional screw is formed into a columnar rod shape or a conical rod shape as described above, it has the constitution in which the thermal capacities of the screw and the barrel 121 become large, a large amount of heat is required, and a long time is taken before standby with a large amount of heat release.

Further, the conventional screw is externally heated and the heat release amount into the atmosphere is large, but the scroll 12 according to the present invention is of an internal heating type, and therefore, has the advantages that such heat loss is very small, and the temperature raising time is short.

As shown in FIG. 2, the plasticizing block 11 accommodates a heat insulator 54, and a cooling water passage 55 in which cooling water flows is formed adjacently to or in contact with the heat insulator 54. These heat insulator 54 and cooling water passage 55 are each formed into a ring shape to surround the periphery of the barrel 121 to act to suppress diffusion of heat from the barrel 121 to the plasticizing block 11.

Meanwhile, the barrel pocket 52 in the fixed die plate 211 is properly formed to be larger than the barrel 121, so that the back surface (the mold part 2 side) of the barrel 121 forms a hollow space. In addition, a cooling water passage 53 in which the cooling water flows is formed in the fixed die plate 211.

The hollow space in the barrel pocket 52 performs heat insulating action to prevent the heat of the barrel 121 from being transmitted to the mold part 2 and a hot runner 57 which will be described later via the fixed die plate 211, and the cooling water passage 53 compensates for a shortfall of the heat insulating action by the hollow space by allowing the cooling water to flow therein.

Figure 6:
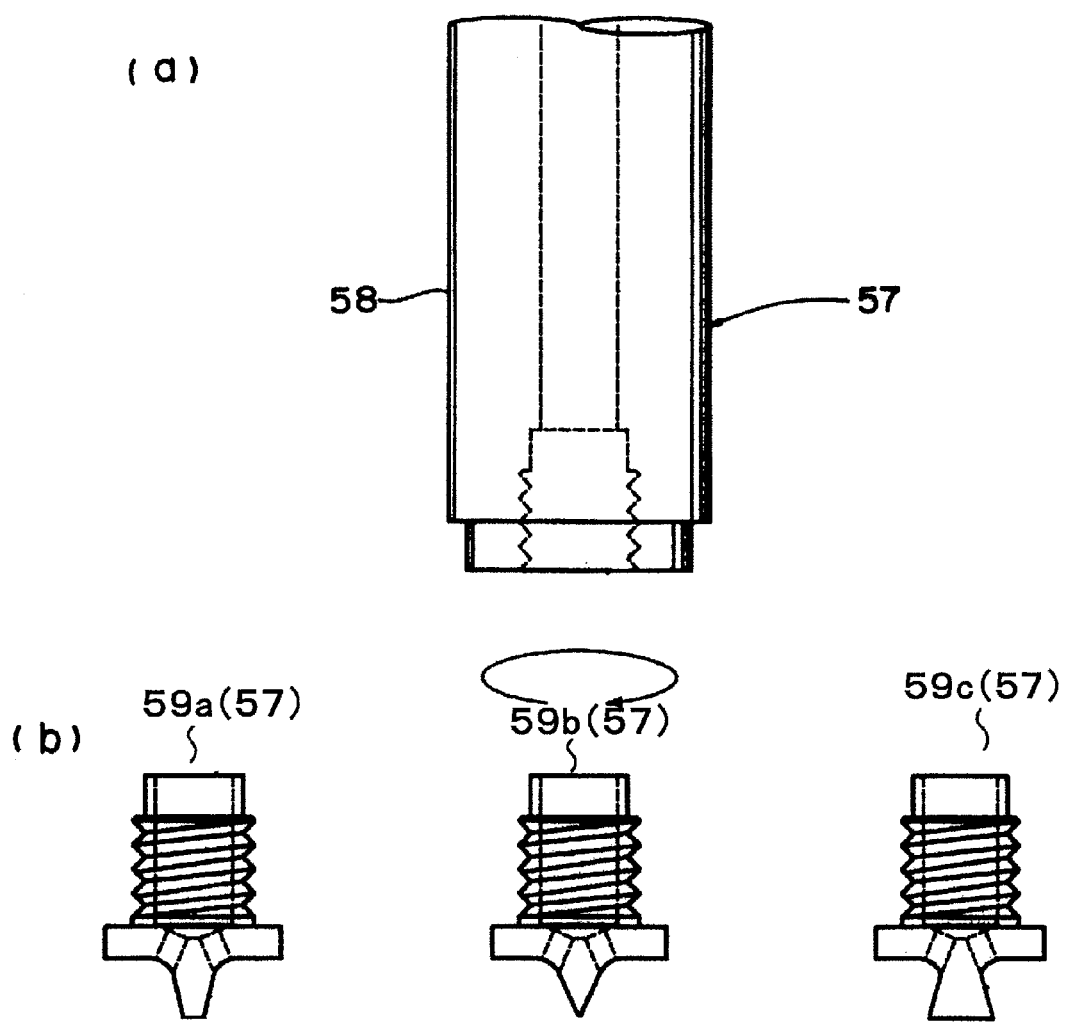
FIG. 6 is a view showing a constitution of a hot runner.

The injection plunger 32 is inserted into the injection cylinders 39 and 41, and the hot runner 57 is provided at a tip thereof to protrude to the mold part 2 side. The hot runner 57 is constituted by a runner tube 58 of a hollow body, and a nozzle 59 threadedly fitted to a tip end of the runner tube 58. As the nozzle 59, the nozzles 59 (59a to 59c) differing in the tip end shape as shown in, for example, FIG. 6 are prepared, and the nozzle 59 is used by being selected from them in accordance with the size such as a thickness of the product to be injection-molded.

Accordingly, injection molding of various kinds of products is made possible by only replacing the nozzle 59, and the advantage of enhancing versatility is obtained.

The weighing block 31 in the weighing and injecting part 3 is provided with the weighing and feeding mechanism which weighs the material and feed it to the mold part 2 via the hot runner 57.

As shown in FIGS. 2, 7 to 10 and the like, the weighing and feeding mechanism has the injection plunger 32 which penetrates through the scroll shaft hole 44 and the like of the scroll 12, a ball screw 33 for plunger, which attachably and detachably engages with the injection plunger 32, and a plunger drive part 61 which weighs and feeds out the material force-fed to the injection plunger 32 by causing the injection plunger 32 to perform piston movement by driving the ball screw 33 for plunger.

Figure 8:
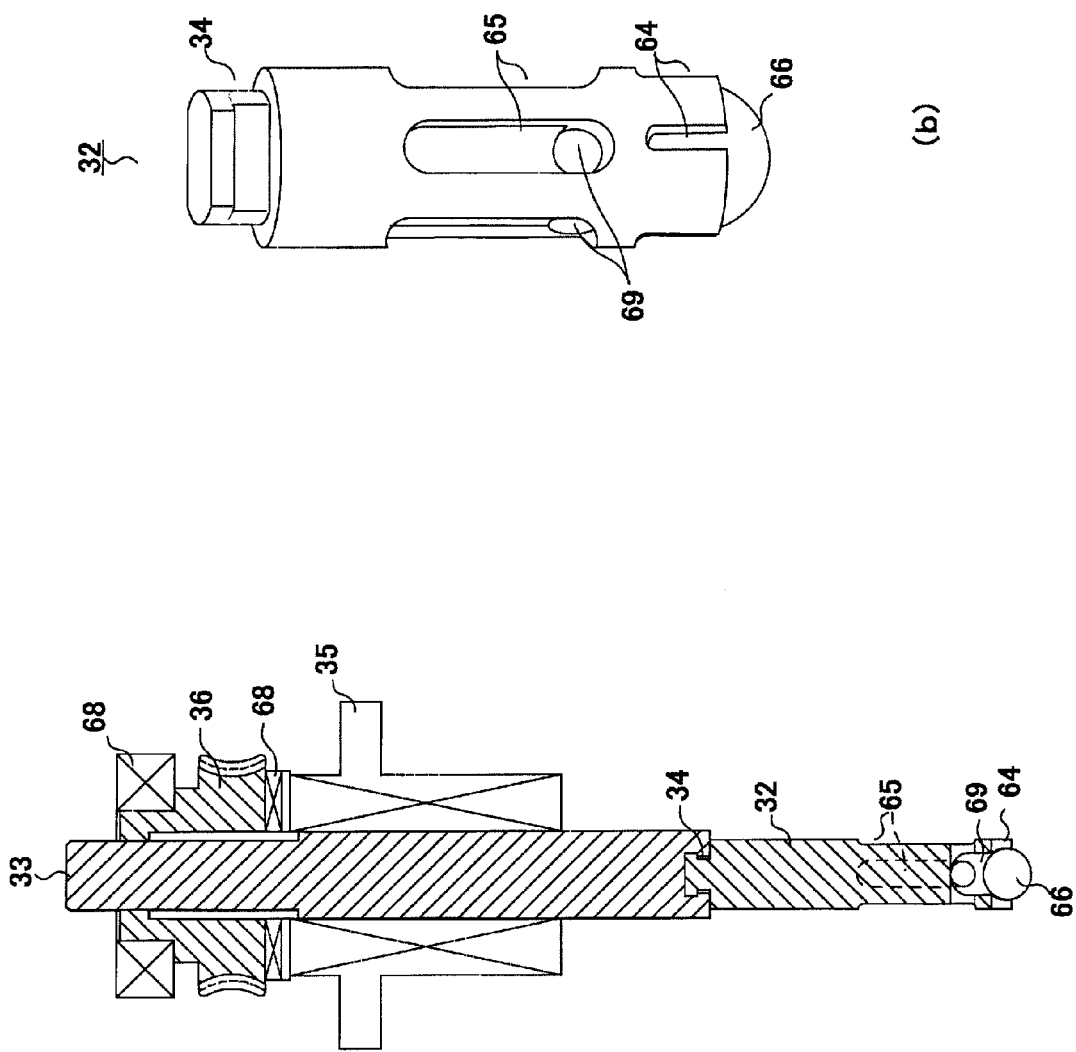
FIG. 8 is a sectional view showing a main part of a weighing and feeding mechanism and a perspective view showing a constitution of an injection plunger.

FIG. 7 is a view of the weighing block 31 seen from the injection plunger 32 side, FIG. 8(*a*) is a sectional view showing a main part of the weighing and feeding mechanism, and FIG. 8(*b*) is a perspective view of the injection plunger 32.

The injection plunger 32 forms a rod-shaped body in appearance, and has a tip end hole 69 bored from its tip end to the inside, an introduction hole 65 which is formed by being trenched in the side surface in the longitudinal direction so that a groove end at the tip end side communicates with the tip end hole 69, a feeding notch 64 which is formed by being notched along the tip end hole 69 to inject the material in the tip end hole 69, and a valve body 66 which is rested the tip end hole 69 while being loosely fitted in the tip end hole 69 to function as a check valve which prevents backflow of the material. The valve body 66 is not limited to the sphere, but may be in a truncated cone shape and the like.

Figure 9:
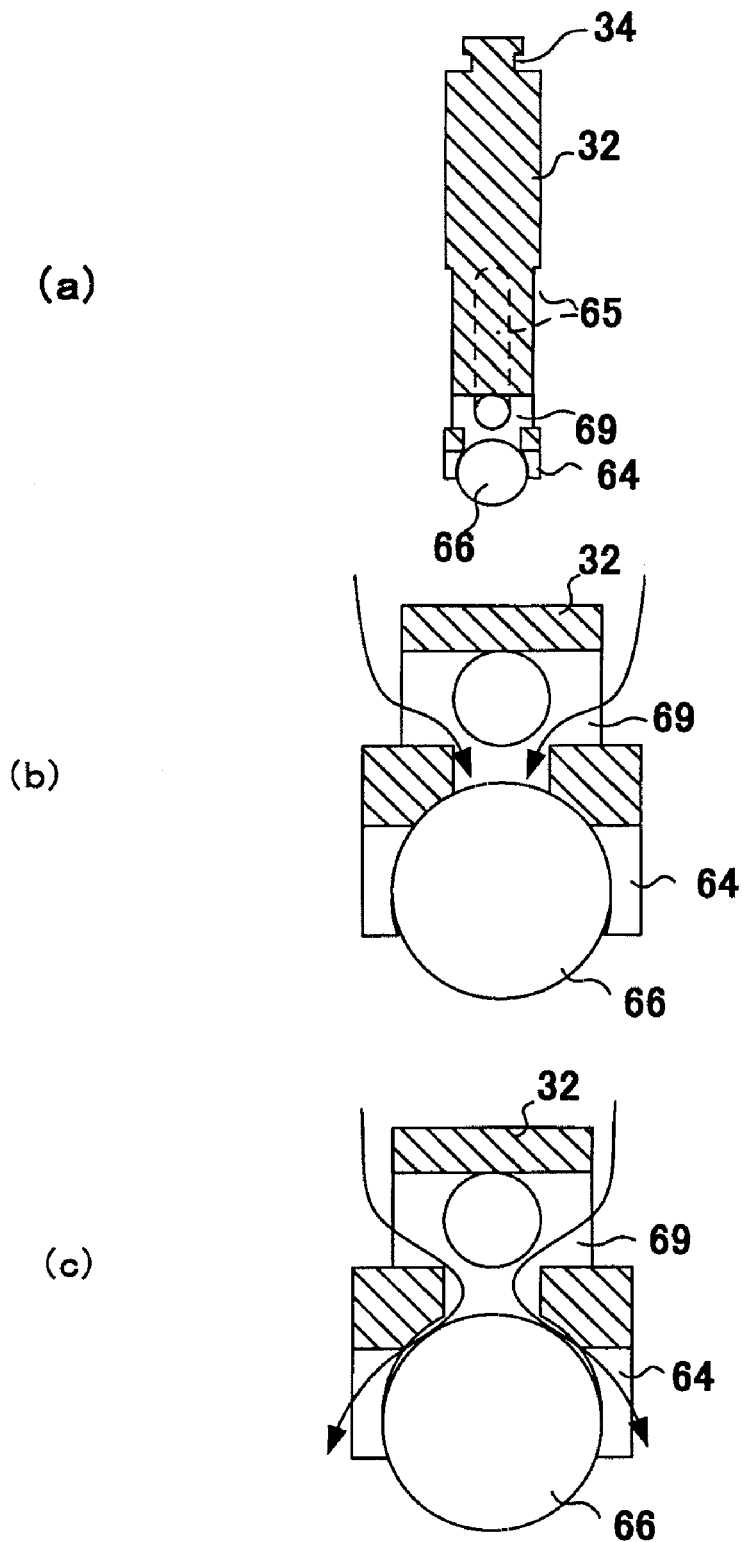
FIG. 9 is a view showing the detailed constitution of the injection plunger in the case of using a spherical ball as a valve body.
Figure 10:
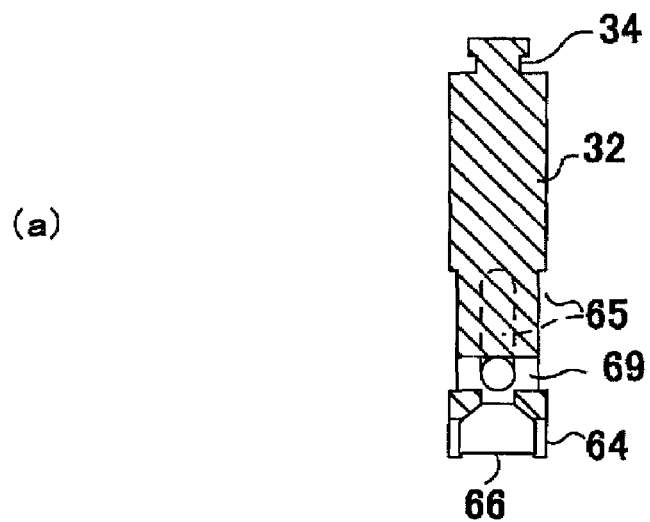
FIG. 10 is a view showing the detailed constitution of the injection plunger in the case of using a valve body in a truncated cone shape.
Figure 10:
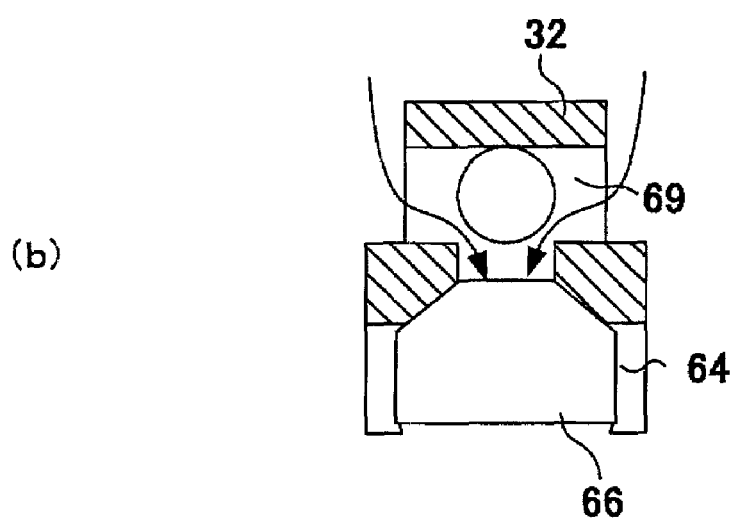
Figure 10:
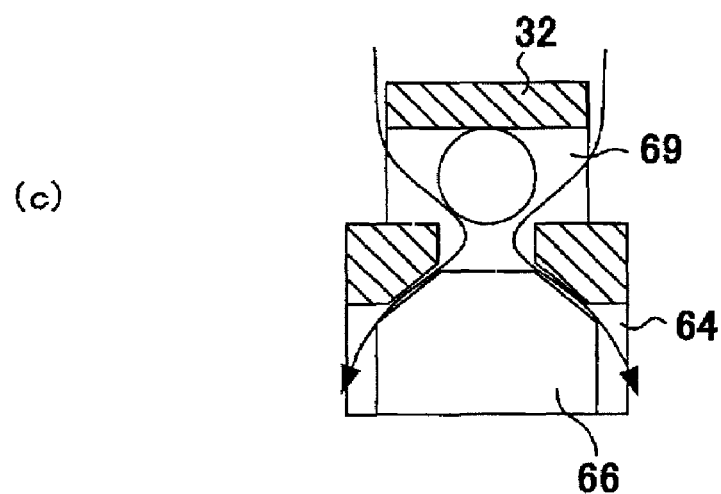

FIG. 9 is a view showing a detailed constitution of the injection plunger 32 when a spherical ball is used as the valve body 66, and FIG. 10 is a view showing detailed constitution when the valve body 66 in a truncated con shape is used. Note that the arrows in FIGS. 9 and 10 show the flow of the material, and FIGS. 9(*b*) and 10(*b*) show the case where the valve body 66 moves upward, while FIGS. 9(*c*) and 10(*c*) show the case where the valve body 66 moves downward.

Then, the injection plunger 32 is inserted into the scroll shaft hole 44 forming the injection cylinder and the injection cylinder 41, and when the pressure at the feeding notch 64 side becomes higher than the pressure at the introduction hole 65 side, the valve body 66 moves upward to shut off the communication of the feeding notch 64 and the introduction hole 65. Thereby, injection of the material is stopped.

When the pressure at the feeding notch 64 side becomes lower than the pressure at the introduction hole 65 side on the other hand, the valve body 66 moves downward to communicate the feeding notch 64 and the introduction hole 65 with each other. Thereby, injection of the material is performed.

In the conventional injection molding apparatus, such a check valve for preventing backflow of a material is also provided, but the check valve of the conventional constitution is designed to prevent the valve body form falling off by mounting a check ring to a tip end of a plunger with a screw with an arrow, and the problem of the screw with the arrow breaking by fatigue in several months has been pointed out.

However, the check valve according to the present invention does not have the requirement of a screw structure, and therefore, does not break by fatigue, and includes the characteristic which does not causes such a problem.

The introduction hole 65 and the like form a torpedo which reduces viscosity of a plasticized molten material and stabilizes the viscosity at the same time. The present invention includes such an important element indispensable for plasticization without providing a special space, and therefore, it achieves reduction in size.

The plunger drive part 61 has a motor 6, a worm gear 37 which obtains a rotational power from the motor 6, and a worm wheel 36 which is meshed with the worm gear 37 to reduce the rotational frequency of the motor 6 to transmit it to the ball screw 33 for plunger, and thereby causes the injection plunger attachably and detachably engaged with the ball screw 33 for plunger to perform piston movement.

The ball screw 33 for plunger has the ball screw structure, and a ball screw nut 35 is fixed to the weighing block 31. Therefore, when the ball screw 33 for plunger rotates, the ball screw 33 for plunger advances and retreats in accordance with the rotational direction.

The injection plunger 32 is connected to the ball screw 33 for plunger, and receives the drive force from the plunger drive part 61 via the ball screw 33 for plunger to perform piston movement inside the injection cylinder. In this case, in order to facilitate dissemble and assemble of the apparatus, the constitution, in which the injection plunger 32 and the ball screw 33 for plunger are connected by a dovetail groove 34 as shown in FIG. 7 instead of coupling, is adopted.

The rotational power of the ball screw 33 for plunger is transmitted from the motor 6 to the ball screw 33 for plunger via the worm gear 37 and the worm wheel 36, and on that occasion, a load is applied on the worm wheel 36 in the axial direction of the ball screw 33 for plunger. Therefore, thrust bearings 68 which bear such a load are provided to sandwich the worm wheel 36.

Incidentally, in the constitution in which a ball screw and a motor of a large capacity are directly connected, and in the constitution in which the injection plunger 32 is driven by hydraulic pressure or pneumatic pressure as conventionally adopted, in the control of the injection plunger 32 at the pressure hold time (injection molding time) and at the plasticizing and weighing time, the injection plunger 32 can freely retreat and release pressure in accordance with the set pressure hold value.

However, when the plunger drive part 61 is constituted by the worm gear 37 and the worm wheel 36 as in the present invention for space saving and reduction in power consumption at the pressure hold time, pressure release becomes difficult, and it sometimes happens that the valve body 66 does not move, so that the material cannot be fed into the runner tube 58.

Thus, in the present invention, a nut biasing spring 100 which abuts on the ball screw nut 35 to bias it to the injection plunger 32 side, and a load cell 101 which abuts on the nut biasing spring 100 to control a load applied to the injection plunger 32 are provided at the weighing block 31, as shown in FIG. 2.

The load cell 101 is controlled so that the ball screw nut 35 can slide within a stroke of, for example, 1 mm or less by the nut biasing spring 100 so as to release pressure when the valve body 66 abuts on the runner tube 58 to be able to inject the material.

The mold is a cassette mold 22 constituted of a movable mold piece (movable side member) 222 mounted to the movable die plate 213, and a fixed mold piece (fixed side member) 221 mounted to the fixed die plate 211.

Figure 11:
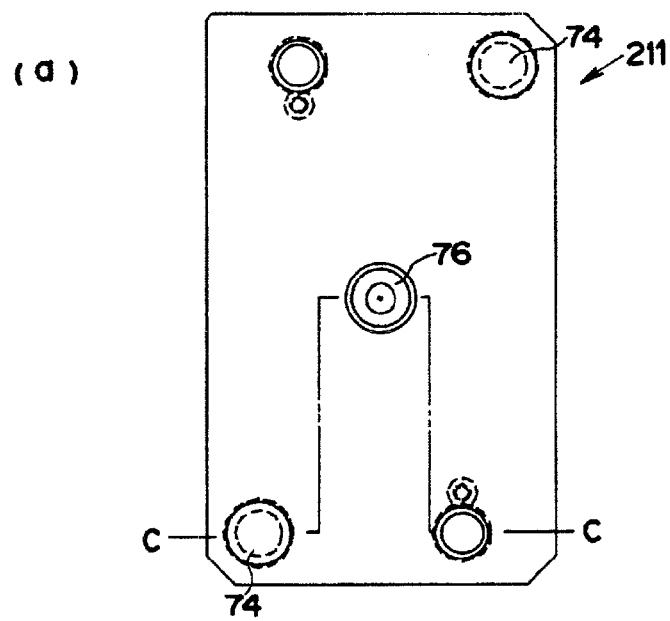
FIG. 11 is a view showing the constitution of a mold.
Figure 11:
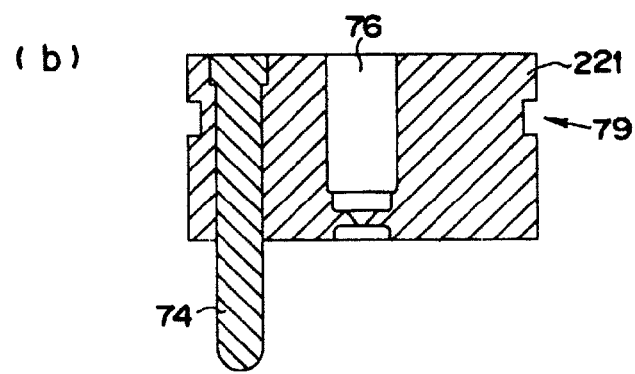
Figure 11:
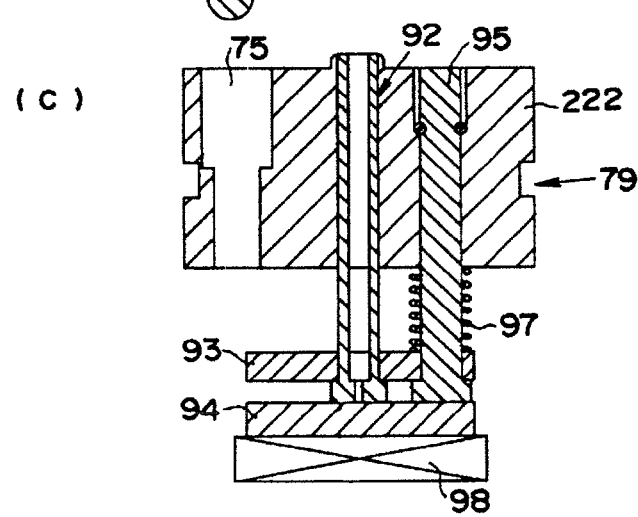

FIG. 11 is a view showing the constitution of such a cassette mold 22, FIG. 11(a) is a front view of the fixed mold piece 221 seen from the injection plunger 32 side, FIGS. 11(b) and 11(c) are sectional views of the fixed mold piece 221 and the movable mold piece 222 taken along in the arrows C-C in FIG. 11(a).

One of the mold pieces 221, 222 is provided with a plurality of positioning pins 74, and the opposing mold piece 222 (221) is provided with pin receiving holes 75 in which the positioning pins 74 are fitted.

Further, in the fixed mold piece 221 mounted to the fixed die plate 211, a runner receiving hole 76 in which the hot runner is inserted is formed.

The movable mold piece 222 is provided with a molded product extruding mechanism. The molded product extruding mechanism includes a support plate 93 to which a plurality of extrusion pins 92 provided to penetrate through the movable mold piece 222 to be inserted into the cavity are fixed, a support rod 95 which is fixed to the support plate 93 and is inserted into the movable mold piece 222, a spring 97 which is inserted into the support rod 95 to normally bias the support plate 93 so that a head portion 99 of the extrusion pin 92 forms a wall surface of the cavity, an extrusion plate 94 fixed to the support plate 93, a thrust bearing 98 mounted to the extrusion plate 94, and an insertion hole 106 formed in the movable die plate 213. The support plate 93, the extrusion plate 94 and the support rod 95 constitute an extruding part 91.

When the molded product extruding mechanism retreats the movable die plate 213 to the clamping housing 212 side by a predetermined amount or more when taking out the injection-molded product, a head portion 105 (see FIG. 2) of the clamping ball screw 23 penetrates through the insertion hole 106 to abut on the thrust bearing 98, and presses the support plate 93 to the cavity side against the spring 97. Thereby, the injection-molded product inside the cavity is extruded by the extrusion pin 92.

Note that the thrust bearing 98 is provided so that the head portion 105 of the clamping ball screw 23 does not damage the extrusion plate 94, and it may be a thrust slide bearing or the like.

Thereby, products can be automatically taken out without assistance of man power without additionally providing a product extruding mechanism, thus making it possible to realize space saving and enhance convenience.

A device that is an element of an air cylinder/piston or a mold opening and closing drive mechanism, which is reduced to about twenty percent, may be included in the movable die plate though the entire length of the injection molding apparatus becomes slightly long.

The cassette mold 22 is a one-side opening type constituted of the fixed mold piece 221 and the movable mold piece 222 as described above, the fixed mold piece 221 being clamped to the fixed die plate 211 with a damper 78, and the movable mold piece 222 being clamped to the movable die plate 213 with the damper 78.

The clampers 78 include clump claws 80 which are engaged with clamp grooves 79 respectively provided at the fixed mold piece 221 and the movable mold piece 222, clamp bolts 81 holding down the clamp claws 80, and springs not shown which bias the clamp claws 80 to open.

The clamp bolts 81 have the tip ends each formed into a semispherical shape, or have valve bodies 66 mounted to the tip ends, and hexagonal wrench grooves are formed at rear ends, so that they are threadedly fitted to the fixed die plate 211 and the movable die plate 213.

The clamp claws 80 are swingably mounted to the fixed die plate 211 and the movable die plate 213, and when the clamp bolts 81 are fastened, the clamp claws 80 abut on the clamp grooves 79, and press the fixed mold piece 221 and the movable mold piece 222 respectively to the fixed die plate 211 side and the movable die plate 213 side to clamp them thereto.

On the other hand, when the clamp bolts 81 are loosened, the springs bias the clamp claws 80 to be away from the fixed mold piece 221 and the movable mold piece 222 to release the clamp.

As shown in FIG. 11, at one of the fixed mold piece 221 and the movable mold piece 222, a plurality of positioning pins 74 are provided, while in the other one, a plurality of pin receiving holes 75 in which the positioning pins 74 are fitted are formed, and they form a positioning mechanism of the cassette mold 22. The positioning pins 74 and the pin receiving holes 75 are provided with very small tapers.

Namely, as described above, the cassette mold 22 is a one-side opening type constituted of the fixed mold piece 221 and the movable mold piece 222, and the movable mold piece 222 abuts on the fixed mold piece 221 to constitute the cavity.

The movable mold piece 222 and the fixed mold piece 221 are of the structure clamped to the movable die plate 213 and the fixed die plate 211, and the movable die plate 213 has the constitution in which it moves by being loosely fitted to the tie bar 40. Therefore, in order to enhance the combination accuracy of the movable mold piece 222 and the fixed mold piece 221, it is necessary to enhance the clamp accuracy and loose fit accuracy.

If the clamp accuracy and loose fit accuracy are demanded, work accuracy and assembly accuracy are required to be high, which causes increase in cost. Therefore, in the present invention, the movable mold piece 222 abuts on the fixed mold piece 221 and the positioning pins 74 are guided by the pin receiving holes 75 and are combined, whereby the combination accuracy of the cassette mold 22 can be ensured without requiring clamp accuracy and loose fit accuracy.

The movable die plate drive mechanism in the clamping housing 212 has the clamping ball screw 23 which is threadedly fitted in a ball screw nut 24 mounted to the movable die plate 213, and a movable die plate drive part 27 which advances and retreats the movable die plate 213 by rotating the clamping ball screw 23 and generates a predetermined clamping force when the movable die plate 213 abuts on the fixed die plate 211.

The movable die plate drive part 27 has a motor 5, a worm gear 26 which obtains rotational power from the motor 5, and a worm wheel 25 which is meshed with the worm gear 26 to reduce the rotational frequency of the motor 5 to transmit it to the clamping ball screw 23, and thereby advances and retreats the movable die plate 213 in which the clamping ball screw 23 is threadedly fitted.

Conventionally, direct-connected combination of the ball screw and a large capacity motor, or use of a reduction gear for the purpose of speed reduction and generation of large torque is generally adopted, and since the reduction gear has the constitution in which a reduction gear ratio is gained by combination of spur gears, there is the problem of increase in size, in addition to which, there is the problem of increase in power consumption because at the pressure holding time, it has to be always energized.

Since as described hereinbefore, in the present invention, the speed reducing mechanism with a large reduction gear ratio constituted by the worm gears 15, 26 and 37 and the worm wheels 14, 25 and 36 are driven respectively by the motors 4, 5 and 6 with small drive capacities in the scroll drive part 42, the plunger drive part 61 and the movable die plate drive part 27, the above described problems do not occur, and reduction in size and power consumption are made possible.

Incidentally, in the injection molding apparatus described hereinbefore, the case where a single material is injection-molded by providing one plasticizing block 11, one weighing block, one fixed die plate 211, one movable die plate 213 and one clamping housing 212 is described, but the present invention is not limited to this, and the present invention is also applicable to the case where a product made of two kinds of materials is injection-molded like two-color molding.

In this case, a plasticizing unit is formed by one plasticizing block 11 and one weighing block, and a plurality of such plasticizing units are provided to be able to inject different materials, and a clamping unit moving part not shown which moves the clamping unit constituted of one fixed die plate 211, one movable die plate 213 and one clamping housing 212 is provided so that the materials from the plurality of plasticizing units can be injected into a cavity of one mold.

Then, the clamping unit is moved by the clamping unit moving part correspondingly to injection of the material of each of the plasticizing units, and thereby, multicolor molding and the like can be facilitated.

INDUSTRIAL AVAILABILITY

The injection molding apparatus according to the present invention can be applied to the apparatuses which manufacture products by injection-molding a thermoplastic resin, a thermoset thing resin, wax, and magnetic powder, iron powder and ceramics coated with binder.

The injection molding apparatus according to the present invention can be also used as a component manufacture and supply apparatus of an assembly line, and as a test apparatus which can be placed on a table in research and experiment.

A molding machine of the capacity of a clamping force of 1 tf, and injection pressure of 3,000 kgf/cm$^2$ can be constitution with outside dimensions of a machine width of 12 cm, a machine height of 12 cm and a machine length of 36 cm.

Further, development to different materials/two color molding becomes possible by the injection molding method for mixing and molding two kinds of materials or more or colored materials by mounting two or more plasticizing and injecting units on the clamping device of the injection molding machine capable of rotating or sliding the movable mold on the movable die plate 213.

The invention claimed is:

1. An injection molding apparatus which injection-molds a product by injecting a plasticized material into a cavity of a mold, comprising:
    a plasticizing block that includes therein a plasticizing and force-feeding mechanism which heats and plasticizes a material and force-feeds the material while kneading it;
    a weighing block that is connected to the plasticizing block in close contact with it, and includes therein a weighing and feeding mechanism which weighs and feeds out the material force-fed by said plasticizing and force-feeding mechanism;
    a fixed die plate that includes therein an injection mechanism which injects the material weighed and fed out by said weighing and feeding mechanism into a cavity;
    a movable die plate that advances to and retreats from the fixed die plate and makes said cavity a substantially closed space when abutting on the fixed die plate; and
    a clamping housing that includes therein a movable die plate drive mechanism which is fixedly provided at a predetermined distance from said fixed die plate by a plurality of tie bars for guiding said movable die plate, advances and retreats the movable die plate to and from said fixed die plate, and generates a predetermined clamping force when the movable die plate abuts on said fixed die plate.

2. The injection molding apparatus according to claim 1, wherein said plasticizing and force-feeding mechanism has a barrel that heats and plasticizes the material,
    a scroll of a substantially short columnar rotary body that has a spiral groove for transferring the material formed therein, promotes plasticizing and kneading of the material in said spiral groove by rotating while contacting in plane with said barrel, and force-feeds the material into an injection cylinder formed in its center of rotation, and
    a scroll drive part which rotates the scroll.

3. The injection molding apparatus according to claim 2, wherein the spiral groove in said scroll comprises
    a scraping groove that is formed by cutting with an end mill applied to a side surface of the rotary body in parallel with a rotational axis of the scroll, and takes charge of scraping the material, and a feeding groove that is formed by cutting a front surface of the rotary body into a spiral shape continuously from the scraping groove to reduce toward the center of rotation, and takes charge of transferring, plasticizing, kneading and force-feeding the scraped material.

4. The injection molding apparatus according to claim 1, wherein said weighing and feeding mechanism has an injection plunger that is inserted into said injection cylinder, a ball screw for the plunger that is attachably and detachably engaged with the injection plunger by a dovetail groove, and a plunger drive part that drives the ball screw for the plunger to cause said injection plunger to perform piston movement in said injection cylinder, and thereby applies a feeding force for the force-fed material to the injection plunger.

5. The injection molding apparatus according to claim 4, wherein said injection plunger has a tip end hole formed by being bored from its tip end surface, an introduction hole formed by trenching on a side surface in a longitudinal direction and is formed so that a groove end at the tip end side communicates with said tip end hole, a feeding notch that is formed by notching the tip end hole in the longitudinal direction and feeds out the material from the tip end hole, and a valve body that is stopped in the tip end hole while being loosely fitted in said tip end hole, interrupts injection of the material by shutting off communication of the feeding notch and the introduction hole when pressure at said feeding notch side becomes higher than pressure at the introduction hole side, and allows injection of the material by communicating said feeding notch and the introduction hole to communicate with each other when the pressure at said feeding notch side becomes lower than the pressure at the introduction hole side.

6. The injection molding apparatus according to claim 5, wherein said injection mechanism includes a hot runner in which the material fed out by said injection plunger flows, a nozzle that injects the material into said cavity by being selected in accordance with a product to be injection-molded and mounted to a tip end of said hot runner, and a hot runner hole that accommodates the hot runner and the nozzle to be capable of being inserted in and extracted from it.

7. The injection molding apparatus according to claim 1, wherein a mold which forms said cavity has a fixed mold piece that is mounted to said fixed die plate, a movable mold piece that is mounted to said movable die plate and forms a cavity of a substantially closed space when the movable die plate abuts on said fixed die plate, a taper pin formed in one of the movable mold piece and said fixed mold piece, and a taper hole that is formed in the other of the mold pieces and performs positioning of said taper pin inserted into it when said movable mold piece abuts on said fixed mold piece.

8. The injection molding apparatus according to claim 7, further comprising:

an extruding part to which a plurality of extrusion pins provided to penetrate through said movable mold piece to be inserted into said cavity are fixed;

a spring that biases said extruding part so that head portions of said extrusion pins normally form a wall surface of the cavity; and an insertion hole which is formed in said movable die plate, and allows a head portion of a clamping ball screw to penetrate through it to abut on said extruding part to press the extruding part to the cavity side against said spring to thereby make it possible to extrude an injection molded product in the cavity, when the movable die plate retreats to said clamping housing side by a predetermined amount or more.

9. The injection molding apparatus according to claim 1, wherein a plurality of plasticizing units each constituted of one of said plasticizing block and one of said weighing block are provided, one clamping unit constituted of one of said fixed die plate, one of said movable die plate and one of said clamping housing is provided, and a clamping unit moving part that moves said clamping unit correspondingly to each of the plasticizing units so that different materials can be injected into one cavity is provided.

10. The injection molding apparatus according to claim 2, wherein respective abutting surfaces of said scroll and said barrel are formed into conical shapes.

11. The injection molding apparatus according to claim 10, wherein the respective abutting surfaces of said scroll and said barrel are formed into concave conical shapes recessed to the scroll side.

12. The injection molding apparatus according to claim 11, wherein the spiral groove in said scroll comprises a scraping groove that is formed by cutting with an end mill applied to a side surface of a rotary body in parallel with a rotational axis of the scroll and takes charge of scraping the material, and a feeding groove that is formed by cutting a front surface of the rotary body into a spiral shape continuously from the scraping groove so as to reduce toward a center of rotation, and takes charge of transferring, plasticizing, kneading and force-feeding the scraped material.

13. The injection molding apparatus according to claim 12, wherein said scroll drive part has a worm gear obtaining rotational power from a motor, and a worm wheel that is meshed with the worm gear to reduce rotational frequency of said motor, and attachably and detachably engages with said scroll via a heat insulating plate to rotate the scroll at a reduced rotational frequency.

14. The injection molding apparatus according to claim 13, wherein said weighing and feeding mechanism has an injection plunger that is inserted into said injection cylinder, a ball screw for the plunger that is attachably and detachably engaged with the injection plunger by a dovetail groove, and a plunger drive part that drives the ball screw for the plunger to cause said injection plunger to perform piston movement in said injection cylinder, and thereby applies a feeding force of the force-fed material to the injection plunger.

15. The injection molding apparatus according to claim 14, wherein said injection plunger has a tip end hole formed by being bored from its tip end surface, an introduction hole formed by trenching on a side surface in a longitudinal direction and is formed so that a groove end at the tip end side communicates with said tip end hole, a feeding notch that is formed by notching the tip end hole in the longitudinal direction and feeds out the material from the tip end hole, and a valve body that is stopped in the tip end hole while being loosely fitted in said tip end hole, interrupts injection of the material by shutting off communication of the feeding notch and the introduction hole when pressure at said feeding notch side becomes higher than pressure at the introduction hole side, and allows injection of the material by communicating said feeding notch and the introduction hole with each other when the pressure at said feeding notch side becomes lower than the pressure at the introduction hole side.

16. The injection molding apparatus according to claim 15, wherein said injection mechanism includes a hot runner in which the material fed out by said injection plunger flows, a nozzle that injects the material into said cavity by being selected in accordance with a product to be injection-molded and mounted to a tip end of said hot runner, and a hot runner hole that accommodates the hot runner and the nozzle to be capable of being inserted in and extracted from it.

17. The injection molding apparatus according to claim 16, wherein said plunger drive part has a worm gear obtaining rotational power from a motor, and a worm wheel that is meshed with the worm gear to reduce rotational frequency of said motor and transmit it to said ball screw for plunger, and thereby causes said injection plunger attachably and detachably engaged with the ball screw for plunger to perform piston movement.

18. The injection molding apparatus according to claim 17, wherein said movable die plate drive mechanism has a clamping ball screw that is threadedly fitted to a ball screw nut mounted to said movable die plate, a worm gear obtaining rotational power from a motor, and a worm wheel that is meshed with the worm gear to reduce the rotational frequency of said motor to transmit it to said clamping ball screw, and thereby advances and retreats said movable die plate.

19. The injection molding apparatus according to claim 18, wherein a mold which forms said cavity has a fixed mold piece that is mounted to said fixed die plate, a movable mold piece that is mounted to said movable die plate and forms a cavity of a substantially closed space when the movable die plate abuts on said fixed die plate, a taper pin formed at one of the movable mold piece and said fixed mold piece, and a taper hole that is formed in the other of the mold pieces and performs positioning with said taper pin inserted through it when said movable mold piece abuts on said fixed mold piece.

20. The injection molding apparatus according to claim 19, further comprising:

an extruding part to which a plurality of extrusion pins provided to penetrate through said movable mold piece to be inserted into said cavity are fixed;

a spring that biases said extruding part so that head portions of said extrusion pins normally form a wall surface of the cavity; and an insertion hole which is formed in said movable die plate, and allows a head portion of said clamping ball screw to penetrate through it to abut on said extruding part to press the extruding part to the cavity side against said spring to thereby make it possible to extrude an injection molded product in the cavity, when the movable die plate retreats to said clamping housing side by a predetermined amount or more.

21. The injection molding apparatus according to claim 17, wherein a plurality of plasticizing units each constituted of one of said plasticizing block and one of said weighing block are provided, one clamping unit constituted of one of said fixed die plate, one of said movable die plate and one of said clamping housing is provided, and a clamping unit moving part that moves said clamping unit correspondingly to each of the plasticizing units so that different materials can be injected into one cavity is provided.

* * * * *